(12) United States Patent  (10) Patent No.: US 9,152,951 B2
Okogun  (45) Date of Patent: Oct. 6, 2015

(54) FILTERING DATA ENTRIES ON MOBILE ELECTRONIC DEVICES HAVING AUXILIARY INPUT DEVICES

(75) Inventor: Odion Okogun, Kitchener (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 424 days.

(21) Appl. No.: 13/083,104

(22) Filed: Apr. 8, 2011

(65) Prior Publication Data

US 2011/0265038 A1  Oct. 27, 2011

Related U.S. Application Data

(60) Provisional application No. 61/327,258, filed on Apr. 23, 2010.

(51) Int. Cl.
G06F 3/00  (2006.01)
G06Q 10/10  (2012.01)

(52) U.S. Cl.
CPC .................... *G06Q 10/107* (2013.01)

(58) Field of Classification Search
USPC ......................................................... 715/864
See application file for complete search history.

(56) References Cited

U.S. PATENT DOCUMENTS

| 7,756,388 | B2 * | 7/2010 | Plastina et al. ................. 386/241 |
| 2007/0067738 | A1 | 3/2007 | Flynt |
| 2007/0192708 | A1 | 8/2007 | Lee |
| 2008/0059915 | A1 | 3/2008 | Boillot |
| 2009/0228807 | A1 | 9/2009 | Lemay |

FOREIGN PATENT DOCUMENTS

| EP | 1617637 A1 | 1/2006 |
| EP | 1705661 A1 | 9/2006 |

OTHER PUBLICATIONS

Research in Motion Limited, "BlackBerry Storm 9500/9530 Smartphones",2009 Research in Motion Limited, pp. 1,2,17, 35-38, published in Canada http://docs.blackberry.com/en/smartphone_users/deliverables/13356/BlackBerry_Storm_9500-9530_Smartphones-Learn_More--646527-1103013017-001-5.0-US.pdf.
Telus, BlackBerry, "Advanced Tips and Tricks with the BlackBerry Storm 9530", 2008 Research in Motion Limited, pp. 1, 3 and 12 http://www.bwireless.ca/Attachments/BlackBerry%20Storm%20Tips%20and%20Tricks.pdf.
Corresponding Canadian Patent Application No. 2736309 Examination Report dated Feb. 28, 2014.
European Patent Application No. 11161767.6 Search Report dated Aug. 4, 2011.
European Patent Application No. 11 161 767.6 Examination Report dated Jul. 29, 2015; Examiner: Moltenbrey, Michael.

* cited by examiner

*Primary Examiner* — Thanh Vu
(74) *Attorney, Agent, or Firm* — Perry + Currier, Inc.

(57) ABSTRACT

A method of filtering data entries on a mobile device includes displaying a list of data entries on a display device of the mobile device. An indication of one of the data entries of the list is received at one of an input device and an auxiliary input device. Highlighting the data entry in response to the indication is performed. At an auxiliary input device, a pause of the indication is received. A filter for data entries that match the value of a predetermined field of the highlighted data entry is then executed. Results of the filter are displayed on the display device.

17 Claims, 10 Drawing Sheets

FILTERING DATA ENTRIES ON MOBILE ELECTRONIC DEVICES HAVING AUXILIARY INPUT DEVICES

CROSS-REFERENCE TO RELATED APPLICATIONS

This application claims the benefit of U.S. Provisional Application No. 61/327,258, filed Apr. 23, 2010.

FIELD

The disclosure relates generally to mobile electronic devices and, more particularly, to mobile electronic devices having auxiliary input devices.

BACKGROUND

Numerous types of mobile electronic devices are known. Examples of such mobile electronic devices include, for instance, personal data assistants (PDAs), handheld computers, two-way pagers, cellular telephones, and the like. Other examples of mobile devices include those whose primary function is entertainment and multimedia content reproduction, such as "mp3 players". Many mobile electronic devices also feature wireless communication capability, although many such mobile electronic devices are stand-alone devices that are functional without communication with other devices.

A user of a mobile electronic device may wish to view a list of data items that share a certain data value. Often the user will have to navigate the graphical interface to specify search parameters. The user will specify parameters for the search, and activate a component of the graphic interface to prompt the electronic device to filter for the content using the specified parameters. Specifying filter parameters in a separate screen can be cumbersome, often requiring multiple actions from the user to perform such filtering. Since lists of data may have values that are not fully displayed on a confined display, the user may not always be able to view the data values of the data list when viewing a separate filter parameter screen. The user may not know the full value of the data items of the highlighted field. Navigating to a separate screen to determine the full value of a data item can be time consuming and cumbersome.

Some mobile electronic devices are controlled through a touch-sensitive display, also known as a touchscreen display. In response to a touch input, the mobile device can carry out an action such as filtering a list of messages. However, in devices having touch-sensitive displays sometimes it is undesirable or impractical to use the touch-sensitive display when interacting with the device. For example, touch-sensitive displays receive input by tracking the user's finger. As a result of frequently touching the display, the display may require frequent cleaning. As another example, a mobile device having a touch-sensitive display may implement a virtual keyboard interface on a touch-sensitive display. Some users may prefer a physical keyboard over the virtual keyboard because of the physical distinctions between keys and the tactile feel of the physical keyboard. Some users may prefer mobile devices with a physical keyboard over a device with a touch-sensitive display.

BRIEF DESCRIPTION OF THE DRAWINGS

For a better understanding of the various embodiments described herein and to show more clearly how they may be carried into effect, reference will now be made, by way of example only, to the accompanying drawings which show at least one example embodiment and in which.

DETAILED DESCRIPTION

Figure 1:
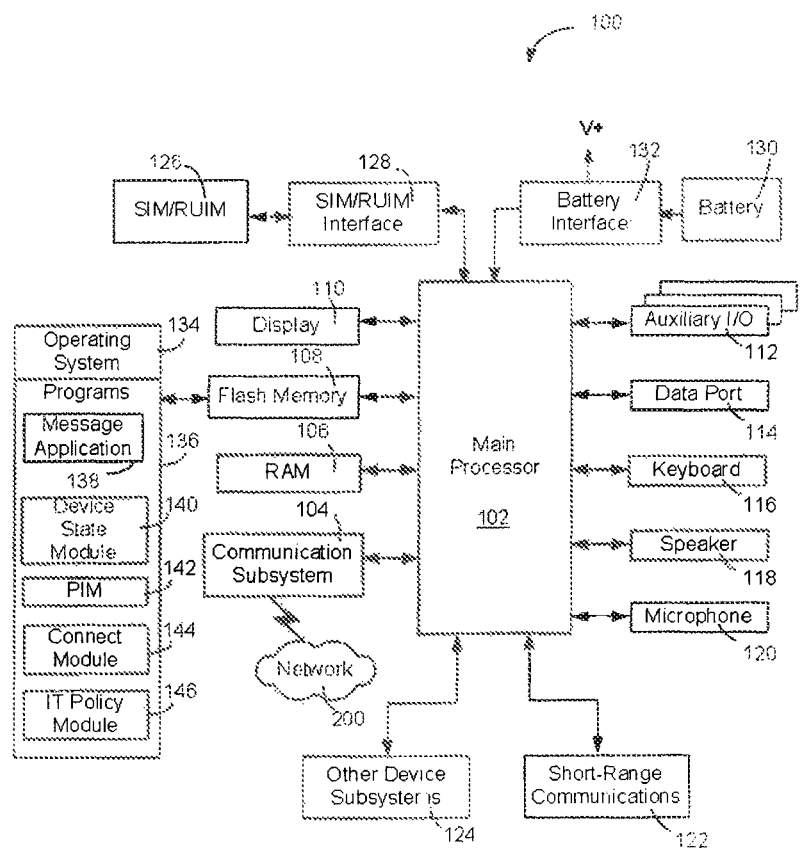
FIG. 1 is a block diagram of an example embodiment of a mobile device.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

The embodiments described herein generally relate to a mobile wireless communication device, hereafter referred to as a mobile device. Examples of applicable communication devices include pagers, cellular phones, cellular smartphones, wireless organizers, personal digital assistants, computers, laptops, mobile wireless communication devices, wirelessly enabled notebook computers and the like.

The mobile device is a two-way communication device with advanced data communication capabilities including the capability to communicate with other mobile devices or computer systems through a network of transceiver stations. The mobile device may also have the capability to allow voice communication. Depending on the functionality provided by the mobile device, it may be referred to as a data messaging device, a two-way pager, a cellular telephone with data messaging capabilities, a wireless Internet appliance, or a data communication device (with or without telephony capabilities). To aid the reader in understanding the structure of the mobile device, reference will now be made to FIG. 1.

Referring to FIG. 1, shown therein is a block diagram of an example embodiment of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example embodiment of the mobile device 100, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 104 with the wireless network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 200 associated with mobile device 100 is a GSM/GPRS wireless network in one example embodiment, other wireless networks may also be associated with the mobile device 100 in variant embodiments. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network 200. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is a battery-powered device and includes a battery interface 132 for receiving one or more rechargeable batteries 130. In at least some embodiments, the battery 130 can be a smart battery with an embedded microprocessor. The battery interface 132 is coupled to a regulator (not shown), which assists the battery 130 in providing power V+ to the mobile device 100. Although current technology makes use of a battery, future technologies such as micro fuel cells may provide the power to the mobile device 100.

The mobile device 100 also includes an operating system 134 and software components 136 to 146 which are described in more detail below. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some embodiments, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 200. PIM data items may be seamlessly integrated, synchronized, and updated via the wireless network 200 with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network 200, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network 200. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: an optical track pad, mouse, track ball, infrared fingerprint detector, a roller wheel with dynamic button pressing capability, a mechanical keyboard having touch-sensitive capability, or similar device capable of responding to input from a user's finger or a stylus. The keyboard 116 is preferably an alphanumeric keyboard and/or telephone-type keypad. However, other types of keyboards may also be used. A composed item may be transmitted over the wireless network 200 through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

Figure 2:
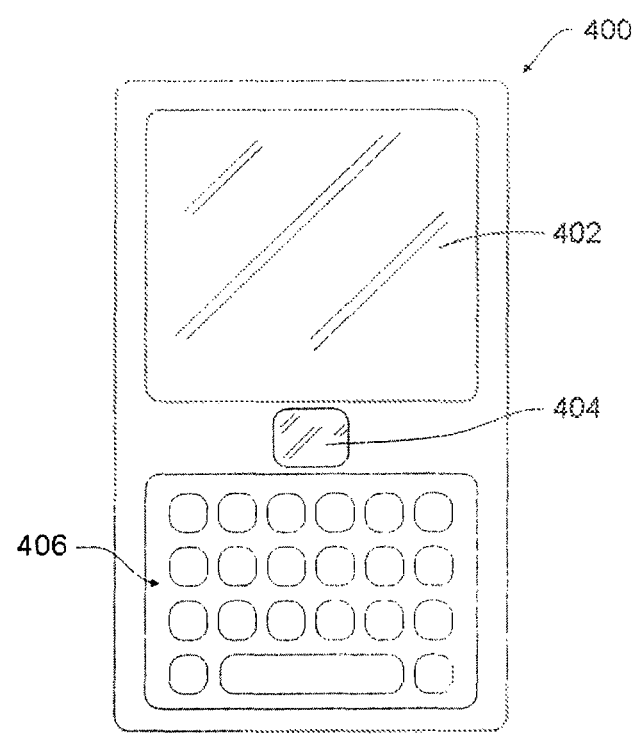
FIG. 2 is an example of a mobile device having an optical track pad auxiliary input device.
Figure 3:
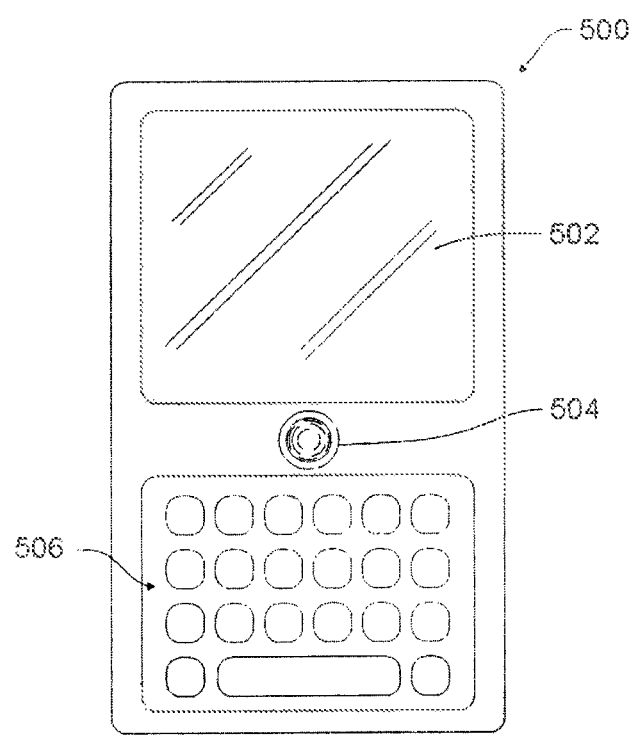
FIG. 3 is an example of a mobile device having a trackball auxiliary input device.

FIGS. 2 and 3 provide examples of auxiliary input devices discussed above. Auxiliary input devices provide input signals to the main processor 102 of FIG. 1. Auxiliary input devices may provide various input signals, including but not necessarily limited to directional movement, unmoving presence of a finger or other navigational aid such as a stylus, a tap input, as well as inputs of "down click" upon pressing the auxiliary input device, and "up click" upon releasing the auxiliary input device.

Referring now to FIG. 2, an example diagram of a mobile device 400 comprising an optical trackpad auxiliary input device 404, a display device 402 and a primary input device 406. In the instance of an optical trackpad auxiliary input device 404, input member features a light-transmissive (transparent or translucent) fixed domed lens and a light source to illuminate a user's finger and a sensor to capture the finger's instructive movement as the user slides his finger over the fixed domed lens in a manner similar to using a conventional trackball (in which rotation of a ball causes roller sensors to rotate). While the description as provided herein refers to a user's finger, the description equally applies to other way in which a user could actuate the domed member including through the use of a thumb or other digit. In another embodiment, the optical trackpad auxiliary input device 404 features a light-transmissive ball that the user actually rotates in a manner somewhat more similar to using a conventional trackball, but the optical trackpad auxiliary input device 404 still features optically based sensing devices to measure rotation of the ball. In other words, in both embodiments, optical rather than mechanical means are used to measure movement of the user's finger and translate that movement into a navigational command to the mobile device 400. The optically based device can be implemented using various forms of light including but not limited to visible light, infrared light, laser, and the like. The optical trackpad auxiliary input device 321 is further configured such that an entry command (for example, selection of a graphical user interface icon, a highlighted menu item, and the like) is entered by depressing the optically based user input device.

Referring now to FIG. 3, another example diagram of a mobile device 500 comprising a trackball auxiliary input device 504, a display device 502 and a primary input device 506. In the instance of a trackball auxiliary input device, paired sensors may be located about the trackball for sensing rotational motion of the trackball which is representative of the desired direction the user would like the cursor to move on the screen. The trackball itself is capable of free rotation within its receiving socket which gives the user an impression that he or she can direct cursor motion on the screen in any direction desired within the area of the display screen. One embodiment provides the navigational tool in the form of a trackball which is easily utilized to instruct two-dimensional screen cursor movement in substantially any direction, as well as act as an actuator when the ball of the trackball is depressible like a button.

In one embodiment, an auxiliary input device generates input for the processor as a user's thumb or finger passes over the surface of said auxiliary input device. When the finger ceases to move, the optical auxiliary input device maintains an input signal to the processor. Ceasing of movement while maintaining presence is one example of a pause in navigation, an indication that the user is operating the electronic device but is not desiring change in navigation of the user interface. The pause input is separate and distinct from receiving no input from the auxiliary input device.

In one embodiment, a timer may be configured to track the navigation, and can be used to differentiate between directional navigation and a pause in navigation. The timer may be configured with a threshold to detect such a pause. For example, the duration of cessation of movement at the auxiliary input device can be compared with a threshold of 1 second.

When the duration of cessation of movement exceeds 1 second, a pause in navigation is determined to have occurred. Other examples of threshold values include 1.5 seconds, 2 seconds, 3 seconds, and any other value that allows the user to provide a separate and distinct pause input. Moreover, the threshold may be configurable by the user.

Another example of a pause in navigation can alternatively be an extended click input, detected using an auxiliary input device that is configured to provide one signal to the processor upon being depressed, and a different signal to the processor upon being released. In one embodiment, the extended click can be used to detect a pause in navigation, without relying on detection of presence.

As discussed above, data may be stored in the mobile device 100 of FIG. 1 in the flash memory 108 or RAM 104. Some data may be user application data, such as messages, contacts, calendar, or multimedia data such as audio, video. Some mobile electronic devices facilitate interaction with a user through a graphical user interface presented upon the display 110. In order to present data to a user in a meaningful way, it is often necessary for the mobile electronic device to present the data in an organized fashion. One common form of organizing data is to present the data in an ordered or unordered list. Often when a significant amount of data is presented to the user, the list of data may not fit on the display, and the user will have to scroll the graphical interface in order to view data that is not currently displayed on the display 110. Frequently, a list format provides a convenient method of presenting information. In a list format, a list of rows or partial rows of a database are displayed as data items, wherein the list may display the value or a partial value of one or more fields of each data item. Each entry in the list may represent a distinct data item. Each field of a data item will have a value.

Figure 4:
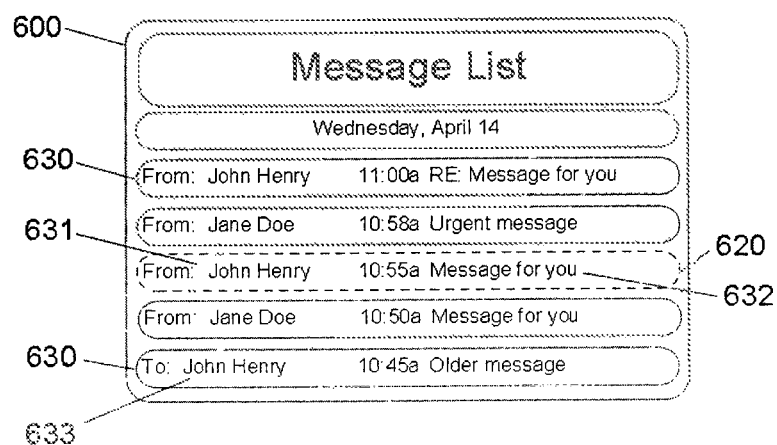
FIG. 4 is an illustrative graphical interface on a mobile electronic device in which a list of messages is displayed and a particular entry in the list is highlighted.

FIG. 4 is an illustrative graphical interface on a mobile electronic device in which a message list 600 is displayed in a graphical interface. Each individual message 630 may be a distinct data item in the list. In FIG. 4, the data fields displayed include the sender field 631 and the message subject 632. One skilled in the art will appreciate that other data fields, such as message recipient 633 may be displayed, particularly in instances when such a message 630 originated from the messaging account associated with the mobile device. One skilled in the art will appreciate that some of the fields of the data items, such as the message body in the example of FIG. 4, are not necessarily displayed when multiple data items are displayed in a list. One skilled in the art will also appreciate that other fields of the data items, such as the message subject in the example of FIG. 4, may not necessarily be displayed in full, but only part of the data value is displayed in the graphical interface. One skilled in the art will also appreciate that only a subset of a data list may be presented on a display, and that the data items appearing on the display may be a subset of the data items in a particular database.

The user may navigate using the auxiliary input device 112 to highlight a specific message 620 in the list of messages (as indicated by a dashed line). As described above, a pause in navigation may be detected when a specific item in the list has been highlighted.

Upon detecting the pause in navigation as described above, the processor may perform a filter of the message list 600 based upon the value of a particular field in the highlighted item. For example, the message list may be filtered on a value of the name of the sender, the name of the recipient, or the subject of the message, as examples. In an embodiment where the processor is configured to provide only one option for filtering the list, a menu need not be displayed as the pause has provided an unambiguous input. In one example, a mobile device may have a cursor which may be positioned over individual fields in the graphical interface displaying the data items of the message list. In this embodiment the processor can determine that the field highlighted is the field upon which the data list should be filtered, and the value of that field in the highlighted data item is the value which the filtered data items ought to match.

Figure 5:
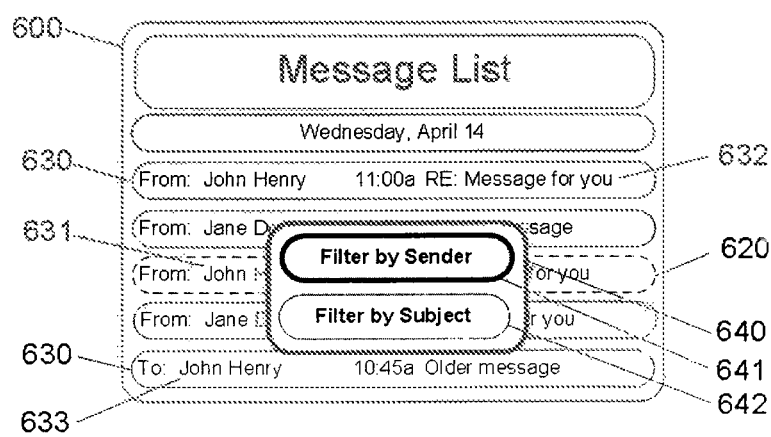
FIG. 5 is an illustrative graphical interface on a mobile electronic device in which a menu is displayed presenting options to filter the displayed list of messages of FIG. 4.

If the processor is configured to filter on one of several data fields, a menu may be presented to the user when the pause in navigation is detected. As described above, a user may navigate a message list 600 and highlight a selected message 620. FIG. 5 provides an example where the processor, upon receiving the pause input, may configure the display to show a menu 640 displaying the options for filtering the message list by sender name 641 or message subject 642. One skilled in the art will appreciate that the recipient name or another data field of a message can be presented to the user as options for filtering the message list 600. These field names are provided as examples only and are not meant to be limiting. One skilled in the art will appreciate that any data field of a data item can be used to filter the list, and the menu options need not be limited to only those data fields that are displayed in the message list 600. One skilled in the art will appreciate that as an alternative to the name of the data field, the value of the data field or a combination of the name of the data field and the value of the data field can be displayed to the user in the menu 640.

The previous paragraphs describe examples of how the processor may determine the field upon which to filter a message list 600, and the value of the field that each data item in the result set ought to match. The filtering of the list can be performed in many ways. The entire value of the highlighted field may be fully matched in said field in the resulting data items. For example, a processor may be configured to match messages in which the sender field 631 contains the value "John Henry", in which the messages in the message list 600 with the value "Johnny" or "John Doe" may be excluded from the filtered result. In another method of filtering, the value of the highlighted field may be partially matched. If the processor filters a message list to match the message subject "Re: Tasks", the processor can be configured to filter messages in which the message subject of each message contains the string "tasks".

Figure 6:
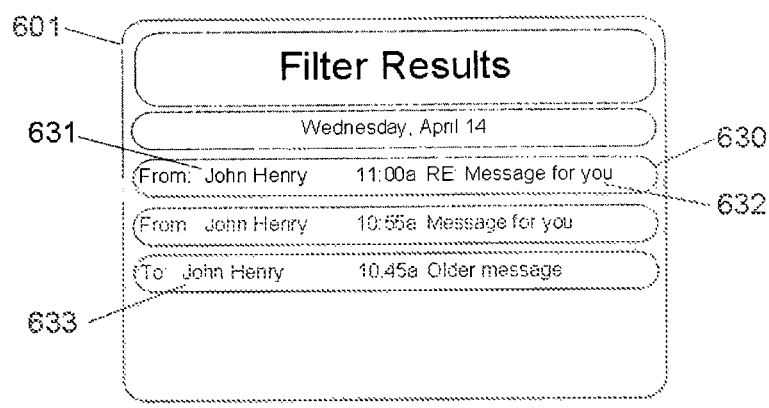
FIG. 6 is an illustrative graphical interface on a mobile electronic device in which the list of messages of FIG. 4 has been filtered.

Once the processor has determined the field upon which to filter the message list 600, and the value of the data field upon which to filter messages, the processor will typically perform the filtering of the message list and determine a filtered result set of data items. The processor will typically present the filtered list on the display of the mobile electronic device in a filtered results list 601 of the graphical interface. FIG. 6 is an example embodiment of the filtered message list of FIG. 4, when the message list has been filtered based upon the sender or recipient having the name "John Henry".

One skilled in the art will recognize that similar filtering can be implemented upon the detection of a pause in navigation in other applications in which data is presented to the user in the form of a list.

Figure 7A:
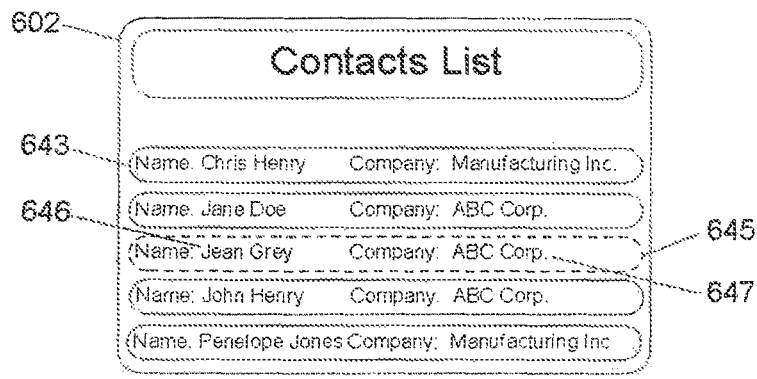
FIG. 7A is an illustrative graphical interface on the mobile electronic device in which a list of contacts is displayed.
Figure 7B:
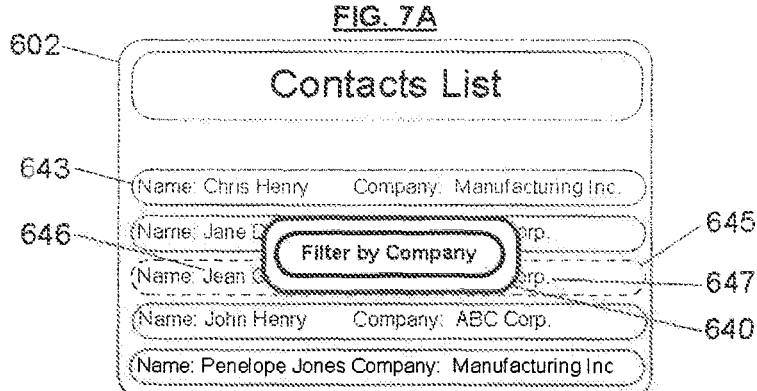
FIG. 7B is an illustrative graphical interface in which a menu is displayed presenting an option to filter the displayed list of contacts.
Figure 7C:
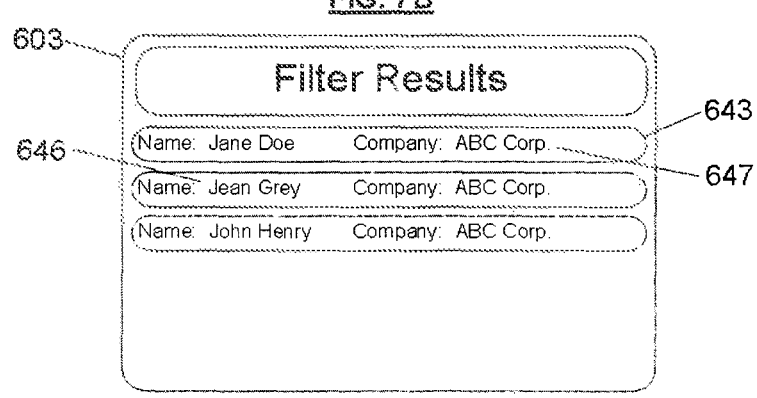
FIG. 7C is an illustrative graphical interface in which the list of contacts from FIG. 7A has been filtered.

FIGS. 7A, 7B and 7C are an example embodiment in which a list of contacts is filtered based upon company name of the highlighted contact 645. In FIG. 7A, a contact item 643 is displayed in a contacts list 602. Each contact item 643 contains data values for contact name 646 and contact company name 647. One skilled in the art will recognize that other data items may also be displayed in the contact list. A highlighted contact item 645 may provide the data item containing the data values upon which the processor will filter the contacts list. FIG. 7B provides an example of a menu 640 that may be displayed in the graphical interface, prompting a filter based on a data field or data item of the highlighted contact item 645. One skilled in the art will appreciate that in the case where only one option is provided in the menu 640, the processor may be configured to filter the list of data items directly without displaying the prompt in the graphical interface. FIG. 7C provides an example of a filtered results list 603 in which the processor configures the display to show the filtered results of the contacts list 602 with data items matching the data value of the highlighted contact item 645.

Figure 8A:
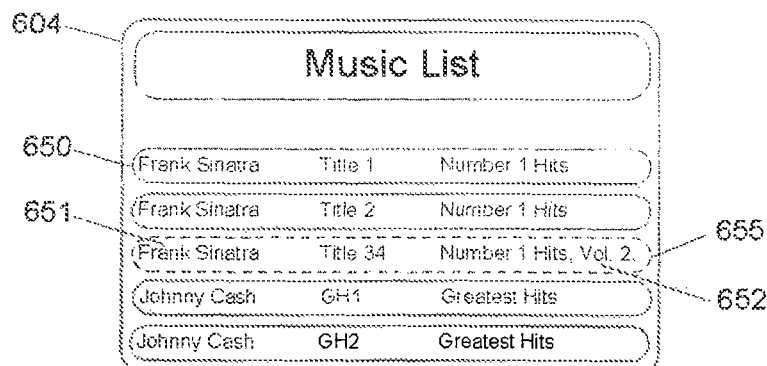
FIG. 8A is an illustrative graphical interface on the mobile electronic device in which a list of music tracks is displayed.
Figure 8B:
FIG. 8B is an illustrative graphical interface in which a menu is displayed presenting an option to filter the displayed list of music tracks.
Figure 8C:
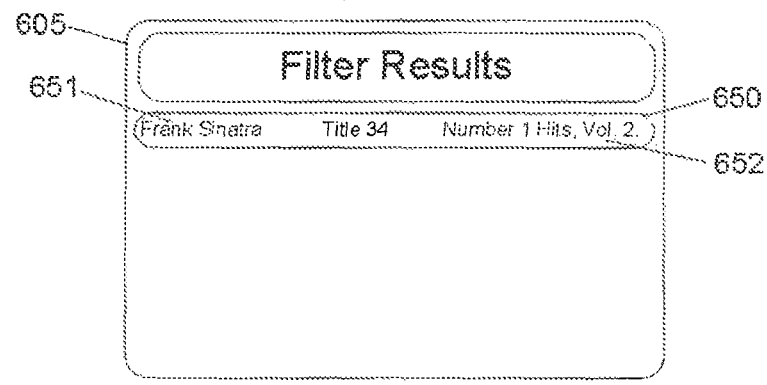
FIG. 8C is an illustrative graphical interface in which the list of music tracks from FIG. 8A has been filtered.

FIGS. 8A, 8B, and 8C provide example embodiment in which a list of music tracks is filtered based upon album name of the highlighted music track 655. In FIG. 8A, a music track item 650 is displayed in a music track list 604. Each music track item 650 contains data values for music track artist 651 and music track album 652. One skilled in the art will recognize that other data items may also be displayed in the music track list. A highlighted music track item 655 may provide the data item containing the data values upon which the processor will filter the contacts list. FIG. 8B provides an example of a menu 640 that may be displayed in the graphical interface, prompting a filter based on a data field or data item of the highlighted music track item 655. FIG. 8C provides an example of a filtered results list 605 in which the processor configures the display to show the filtered results of the music track list 604 with data items matching the data value of the highlighted music track item 655.

Figure 9:
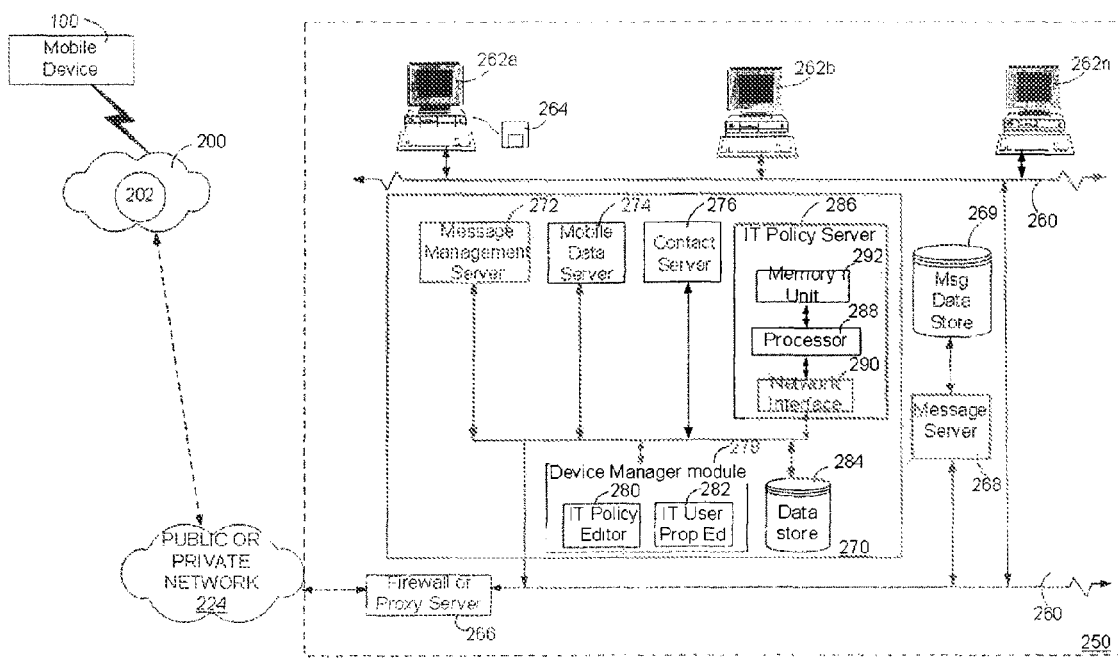
FIG. 9 is a block diagram illustrating components of a host system in one example configuration for use with a mobile electronic device of FIG. 1.

Referring now to FIG. 9, shown therein is a block diagram illustrating components of an example configuration of a host system 250 that the mobile device 100 can communicate with in conjunction with the connect module 144. The host system 250 will typically be a corporate enterprise or other local area network (LAN), but may also be a home office computer or some other private system, for example, in variant embodiments. In this example shown in FIG. 9, the host system 250 is depicted as a LAN of an organization to which a user of the mobile device 100 belongs. Typically, a plurality of mobile devices can communicate wirelessly with the host system 250 through one or more nodes 202 of the wireless network 200.

The host system 250 comprises a number of network components connected to each other by a network 260. For instance, a user's desktop computer 262a with an accompanying cradle 264 for the user's mobile device 100 is situated on a LAN connection. The cradle 264 for the mobile device 100 can be coupled to the computer 262a by a serial or a Universal Serial Bus (USB) connection, for example. Other user computers 262b-262n are also situated on the network 260, and each may or may not be equipped with an accompanying cradle 264. The cradle 264 facilitates the loading of information (e.g. PIM data, private symmetric encryption keys to facilitate secure communications) from the user computer 262a to the mobile device 100, and may be particularly useful for bulk information updates often performed in initializing the mobile device 100 for use. The information downloaded to the mobile device 100 may include certificates used in the exchange of messages.

It will be understood by persons skilled in the art that the user computers 262a-262n will typically also be connected to other peripheral devices, such as printers, etc. which are not explicitly shown in FIG. 4. Furthermore, only a subset of network components of the host system 250 are shown in FIG. 9 for ease of exposition, and it will be understood by persons skilled in the art that the host system 250 will comprise additional components that are not explicitly shown in FIG. 9 for this example configuration. More generally, the host system 250 may represent a smaller part of a larger network (not shown) of the organization, and may comprise different components and/or be arranged in different topologies than that shown in the example embodiment of FIG. 9.

To facilitate the operation of the mobile device 100 and the wireless communication of messages and message-related data between the mobile device 100 and components of the host system 250, a number of wireless communication support components 270 can be provided. In some embodiments, the wireless communication support components 270 can include a message management server 272, a mobile data server 274, a contact server 276, and a device manager module 278. The device manager module 278 includes an IT Policy editor 280 and an IT user property editor 282, as well as other software components for allowing an IT administrator to configure the mobile devices 100. In an alternative embodiment, there may be one editor that provides the functionality of both the IT policy editor 280 and the IT user property editor 282. The support components 270 also include a data store 284, and an IT policy server 286. The IT policy server 286 includes a processor 288, a network interface 290 and a memory unit 292. The processor 288 controls the operation of the IT policy server 286 and executes functions related to the standardized IT policy as described below. The network interface 290 allows the IT policy server 286 to communicate with the various components of the host system 250 and the mobile devices 100. The memory unit 292 can store functions used in implementing the IT policy as well as related data. Those skilled in the art know how to implement these various components. Other components may also be included as is well known to those skilled in the art. Further, in some embodiments, the data store 284 can be part of any one of the servers.

In this example embodiment, the mobile device 100 communicates with the host system 250 through node 202 of the wireless network 200 and a shared network infrastructure 224 such as a service provider network or the public Internet. Access to the host system 250 may be provided through one or more routers (not shown), and computing devices of the host system 250 may operate from behind a firewall or proxy server 266. The proxy server 266 provides a secure node and a wireless internet gateway for the host system 250. The proxy server 266 intelligently routes data to the correct destination server within the host system 250.

In some embodiments, the host system 250 can include a wireless VPN router (not shown) to facilitate data exchange between the host system 250 and the mobile device 100. The wireless VPN router allows a VPN connection to be established directly through a specific wireless network to the mobile device 100. The wireless VPN router can be used with the Internet Protocol (IP) Version 6 (IPV6) and IP-based wireless networks. This protocol can provide enough IP addresses so that each mobile device has a dedicated IP address, making it possible to push information to a mobile device at any time. An advantage of using a wireless VPN router is that it can be an off-the-shelf VPN component, and does not require a separate wireless gateway and separate wireless infrastructure. A VPN connection can preferably be a Transmission Control Protocol (TCP)/IP or User Datagram Protocol (UDP)/IP connection for delivering the messages directly to the mobile device 100 in this alternative embodiment.

Messages intended for a user of the mobile device 100 are initially received by a message server 268 of the host system 250. Such messages may originate from any number of sources. For instance, a message may have been sent by a sender from the computer 262b within the host system 250, from a different mobile device (not shown) connected to the wireless network 200 or a different wireless network, or from a different computing device, or other device capable of sending messages, via the shared network infrastructure 224, possibly through an application service provider (ASP) or Internet service provider (ISP), for example.

The message server 268 typically acts as the primary interface for the exchange of messages, particularly e-mail messages, within the organization and over the shared network infrastructure 224. Each user in the organization that has been set up to send and receive messages is typically associated with a user account managed by the message server 268. Some example embodiments of the message server 268 include a Microsoft Exchange™ server, a Lotus Domino™ server, a Novell Groupwise™ server, or another suitable mail server installed in a corporate environment. In some embodiments, the host system 250 may comprise multiple message servers 268. The message server 268 may also be adapted to provide additional functions beyond message management, including the management of data associated with calendars and task lists, for example.

When messages are received by the message server 268, they are typically stored in a message data store 269 associated with the message server 268. In at least some embodiments, the message data store 269 may be a separate hardware unit that the message server 268 communicates with. Messages can be subsequently retrieved and delivered to users by accessing the message server 268. For instance, an e-mail client application operating on a user's computer 262a may request the e-mail messages associated with that user's account stored on the message data store 269 associated with the message server 268. These messages are then retrieved from the message data store 269 and stored locally on the computer 262a. The message data store 269 associated with the message server 268 can store copies of each message that is locally stored on the mobile device 100. Alternatively, the data store associated with the message server 268 can store all of the messages for the user of the mobile device 100 and only a smaller number of messages can be stored on the mobile device 100 to conserve memory. For instance, the most recent messages (i.e. those received in the past two to three months for example) can be stored on the mobile device 100.

When operating the mobile device 100, the user may wish to have e-mail messages retrieved for delivery to the mobile device 100. The message application 138 operating on the mobile device 100 may also request messages associated with the user's account from the message server 268. The message application 138 may be configured (either by the user or by an administrator, possibly in accordance with an organization's information technology (IT) policy) to make this request at the direction of the user, at some pre-defined time interval, or upon the occurrence of some pre-defined event. In some embodiments, the mobile device 100 is assigned its own e-mail address, and messages addressed specifically to the mobile device 100 are automatically redirected to the mobile device 100 as they are received by the message server 268.

The message management server 272 can be used to specifically provide support for the management of messages, such as e-mail messages, that are to be handled by mobile devices. Generally, while messages are still stored on the message server 268, the message management server 272 can be used to control when, if, and how messages are sent to the mobile device 100. The message management server 272 also facilitates the handling of messages composed on the mobile device 100, which are sent to the message server 268 for subsequent delivery.

For example, the message management server 272 may monitor the user's "mailbox" (e.g. the message store associated with the user's account on the message server 268) for new e-mail messages, and apply user-definable filters to new messages to determine if and how the messages are relayed to the user's mobile device 100. The message management server 272 may also compress and encrypt new messages (e.g. using an encryption technique such as Data Encryption Standard (DES), Triple DES, or Advanced Encryption Standard (AES)) and push them to the mobile device 100 via the shared network infrastructure 224 and the wireless network 200. The message management server 272 may also receive messages composed on the mobile device 100 (e.g. encrypted using Triple DES), decrypt and decompress the composed messages, re-format the composed messages if desired so that they will appear to have originated from the user's computer 262a, and re-route the composed messages to the message server 268 for delivery.

Certain properties or restrictions associated with messages that are to be sent from and/or received by the mobile device 100 can be defined (e.g. by an administrator in accordance with IT policy) and enforced by the message management server 272. These may include whether the mobile device 100 may receive encrypted and/or signed messages, minimum encryption key sizes, whether outgoing messages must be encrypted and/or signed, and whether copies of all secure messages sent from the mobile device 100 are to be sent to a pre-defined copy address, for example.

The message management server 272 may also be adapted to provide other control functions, such as only pushing certain message information or pre-defined portions (e.g. "blocks") of a message stored on the message server 268 to the mobile device 100. For example, in some cases, when a message is initially retrieved by the mobile device 100 from the message server 268, the message management server 272 may push only the first part of a message to the mobile device 100, with the part being of a pre-defined size (e.g. 2 KB). The user can then request that more of the message be delivered in similar-sized blocks by the message management server 272 to the mobile device 100, possibly up to a maximum pre-defined message size. Accordingly, the message management server 272 facilitates better control over the type of data and the amount of data that is communicated to the mobile device 100, and can help to minimize potential waste of bandwidth or other resources.

The mobile data server 274 encompasses any other server that stores information that is relevant to the corporation. The mobile data server 274 may include, but is not limited to, databases, online data document repositories, customer relationship management (CRM) systems, or enterprise resource planning (ERP) applications.

The contact server 276 can provide information for a list of contacts for the user in a similar fashion as the address book on the mobile device 100. Accordingly, for a given contact, the contact server 276 can include the name, phone number, work address and e-mail address of the contact, among other information. The contact server 276 can also provide a global address list that contains the contact information for all of the contacts associated with the host system 250.

It will be understood by persons skilled in the art that the message management server 272, the mobile data server 274, the contact server 276, the device manager module 278, the data store 284 and the IT policy server 286 do not need to be implemented on separate physical servers within the host system 250. For example, some or all of the functions associated with the message management server 272 may be integrated with the message server 268, or some other server in the host system 250. Alternatively, the host system 250 may comprise multiple message management servers 272, particularly in variant embodiments where a large number of mobile devices need to be supported.

Alternatively, in some embodiments, the IT policy server 286 can provide the IT policy editor 280, the IT user property editor 282 and the data store 284. In some cases, the IT policy server 286 can also provide the device manager module 278. The processor 288 of the IT policy server 286 can be used to perform the various steps of a method for providing IT policy data that is customizable on a per-user basis. The processor 288 can execute the editors 280 and 282. In some cases, the functionality of the editors 280 and 282 can be provided by a single editor. In some cases, the memory unit 292 can provide the data store 284.

The device manager module 278 provides an IT administrator with a graphical user interface with which the IT administrator interacts to configure various settings for the mobile devices 100. As mentioned, the IT administrator can use IT policy rules to define behaviors of certain applications on the mobile device 100 that are permitted such as phone, web browser or Instant Messenger use. The IT policy rules can also be used to set specific values for configuration settings that an organization requires on the mobile devices 100 such as auto signature text, WLAN/VoIP/VPN configuration, security requirements (e.g. encryption algorithms, password rules, etc.), specifying themes or applications that are allowed to run on the mobile device 100, and the like.

As has been discussed and as is illustrated in FIGS. 4-8, the user may navigate a graphical interface in order to access information that is stored on the device. One skilled in the art will also appreciate that the data displayed may not be located on the wireless electronic mobile. FIG. 9 illustrates how information may be accessed from the device over a wireless or wired data connection on a local or public network 224. One skilled in the art will appreciate that the filter results 601 of the message list 600 may include message items accessed through a remote filter of the message data store 269.

Figure 10:
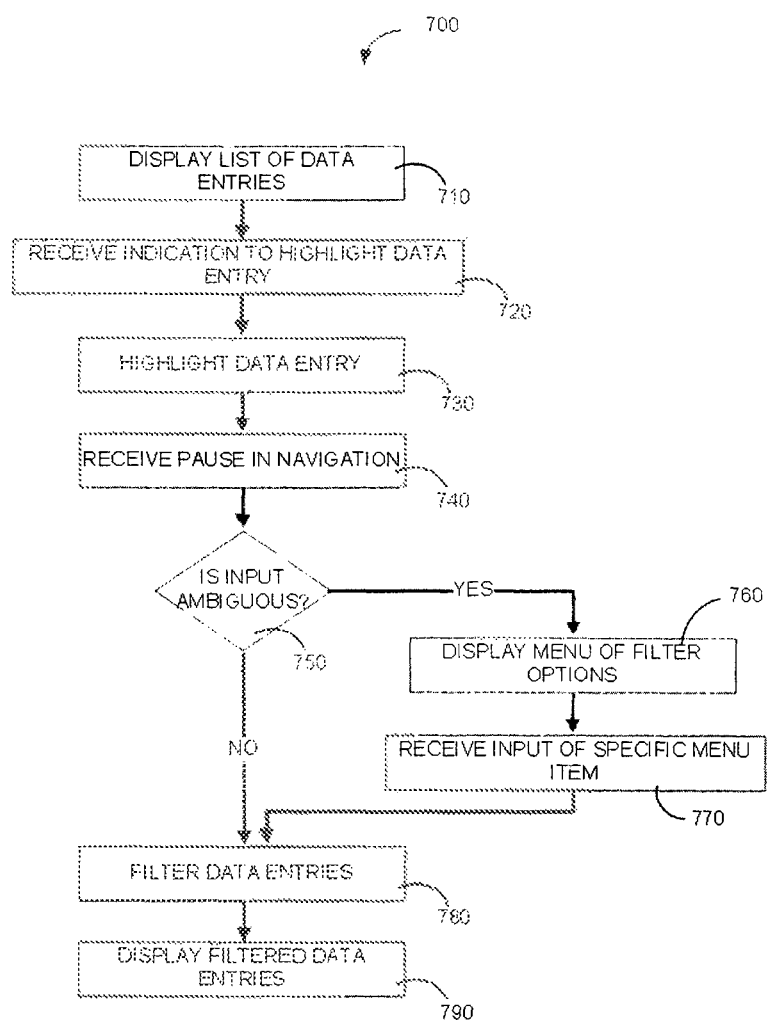
FIG. 10 illustrates a flowchart of an embodiment of a method of filtering data entries.

A method of filtering a data list in response to a pause in navigation is illustrated in FIG. 10. At step 710, a list of data entries is displayed on a display device of a mobile device. At step 720, an input is received from an input device or an auxiliary input device. At step 730, an item is highlighted in response to the input received in step 720. At step 740, a pause in navigation is received. At step 750, a processor of the mobile device determines if the pause in navigation is an ambiguous input or unambiguous input. A pause in navigation is ambiguous if there are multiple fields upon which the processor is configured to filter data items. When the pause in navigation is ambiguous, at step 760 a menu is displayed with a list of the available data item filters. At step 770, and input is received from an input device, allowing for disambiguation of the pause in navigation. If the pause in navigation is unambiguous or when the ambiguous pause in navigation is clarified as a result of the input received at step 770, step 780 is performed in which the processor filters the data entries. At step 790, the list of filtered data entries is displayed.

In an aspect, there is provided herein a method of filtering data entries on a mobile device, wherein each of said data entries contains fields and said fields contain values, and wherein said mobile device accepts input from an auxiliary input device, the method including: displaying a list of said data entries on a display device of the mobile device; receiving at said auxiliary input device an indication of one of the data entries of said list; highlighting the data entry in response to said indication; after said highlighting, receiving at said auxiliary input device a pause of said indication; executing a filter for data entries that match the value of a field of the highlighted data entry; and displaying results of the filter on the display device. In another aspect of the method, the method may further include: displaying a menu on the display device in response to said pause of said indication, wherein said menu comprises at least one menu item, wherein said menu items comprise a command to filter said list based upon a value of a field of the highlighted data entry; and receiving an indication to activate one of the menu items; wherein for said executing of said filter for data entries that match the value of a field of the highlighted data entry, said field is determined by the menu item activated. In another aspect of the method, said data entries represent electronic messages. In another aspect of the method, said highlighted data entry represents an electronic message and said executed filter is a filter for data entries that match the value of the sender field of said highlighted electronic message. In another aspect of the method, said highlighted data entry represents an electronic message and said executed filter is a filter for data entries that match the value of the subject field of said highlighted electronic message. In another aspect of the method, the data entries represent media files. In another aspect of the method, said highlighted data entry represents a media file and said executed filter is a filter for data entries that match the value of the artist field of said highlighted data entry representing a media file. In another aspect of the method, the data entries represent contacts. In still another aspect of the method, said highlighted data entry represents a contact and said executed filter is a filter for data entries that match the value of the company name filed of said highlighted data entry that represents a contact.

In another aspect, there is provided herein a mobile device including: an auxiliary input device; a display device; and a processor, cooperating with said display device and said auxiliary input device, to perform a method of filtering data entries, wherein each of said data entries contains fields and said fields contain values, the method comprising displaying a list of said data entries on the display device; receiving at said auxiliary input device an indication of one of the data entries of said list; highlighting the data entry in response to said indication; after said highlighting, receiving at said auxiliary input device a pause of said indication; executing a filter for data entries that match the value of a field of the highlighted data entry; and displaying results of the filter on the display device. In another aspect of the mobile device, the processor cooperating with said display device and said auxiliary input device may further perform: displaying a menu on the display device in response to said pause of said indication, wherein said menu comprises at least one menu item, wherein said menu items comprise a command to filter said list based upon a value of a field of the highlighted data entry; and receiving an indication to activate one of the menu items; wherein for said executing of said filter for data entries that match the value of a field of the highlighted data entry, said field is determined by the menu item activated. In another aspect of the mobile device, said data entries represent electronic messages. In another aspect of the mobile device, said highlighted data entry represents an electronic message and said executed filter is a filter for data entries that match the value of the sender field of said highlighted electronic message. In another aspect of the mobile device, said highlighted data entry represents an electronic message and said executed filter is a filter for data entries that match the value of the subject field of said highlighted electronic message. In another aspect of the mobile device, the data entries represent media files. In another aspect of the mobile device, said highlighted data entry represents a media file and said executed filter is a filter for data entries that match the value of the artist field of said highlighted data entry representing a media file. In another aspect of the mobile device, the data entries represent contacts. In still another aspect of the mobile device, said highlighted data entry represents a contact and said executed filter is a filter for data entries that match the value of the company name filed of said highlighted data entry that represents a contact.

In still another aspect, there is provided herein a physical computer-readable storage medium on which a plurality of executable instructions is stored for execution by a processor of a mobile device to cause the mobile device to perform a method of filtering data entries on the mobile device, wherein each of said data entries contains fields and said fields contain values, and wherein said mobile device accepts input from an auxiliary input device, the method including: displaying a list of said data entries on a display device of the mobile device; receiving at said auxiliary input device an indication of one of the data entries of said list; highlighting the data entry in response to said indication; after said highlighting, receiving at said auxiliary input device a pause of said indication; executing a filter for data entries that match the value of a field of the highlighted data entry; and displaying results of the filter on the display device. In another aspect, the physical computer-readable storage medium may further store the plurality of executable instructions to perform the steps: displaying a menu on the display device in response to said pause of said indication, wherein said menu comprises at least one menu item, wherein said menu items comprise a command to filter said list based upon a value of a field of the highlighted data entry; and receiving an indication to activate one of the menu items; wherein for said executing of said filter for data entries that match the value of a field of the highlighted data entry, said field is determined by the menu item activated.

What is claimed is:

1. A method of filtering data entries on a mobile device, wherein each of said data entries contains fields and said fields contain values, and wherein said mobile device accepts input from an auxiliary input device, the method comprising:

displaying a list of said data entries on a display device of the mobile device;

receiving at said auxiliary input device an indication of one of the data entries of said list;

highlighting the data entry in response to said indication;

after said highlighting, receiving at said auxiliary input device a pause of said indication;

in response to said pause of said indication, said mobile device executing a filter without further user interaction when said pause of said indication is unambiguous, the filter for data entries that match the value of a field of the highlighted data entry;

displaying a menu on the display device in response to said pause of said indication when said pause of said indication is ambiguous, wherein said menu comprises a menu item, wherein the menu item comprises a command to filter said list based upon a value of a field of the highlighted data entry, and receiving an indication to activate the menu item, wherein for said executing of said filter for data entries that match the value of a field of the highlighted data entry, said field is determined by the menu item that is activated; and displaying results of the filter on the display device.

2. A method of claim 1, wherein said data entries represent electronic messages.

3. A method of claim 2, wherein said highlighted data entry represents an electronic message and said executed filter is a filter for data entries that match the value of a sender field of said highlighted electronic message.

4. A method of claim 2, wherein said highlighted data entry represents an electronic message and said executed filter is a filter for data entries that match the value of a subject field of said highlighted electronic message.

5. A method of claim 1, wherein the data entries represent media files.

6. A method of claim 5, wherein said highlighted data entry represents a media file and said executed filter is a filter for data entries that match the value of an artist field of said highlighted data entry representing a media file.

7. A method of claim 1, wherein the data entries represent contacts.

8. A method of claim 7, wherein said highlighted data entry represents a contact and said executed filter is a filter for data entries that match the value of a company name filed of said highlighted data entry that represents a contact.

9. A mobile device comprising:

an auxiliary input device;

a display device; and a processor, cooperating with said display device and said auxiliary input device, to perform a method of filtering data entries, wherein each of said data entries contains fields and said fields contain values, the processor configured for:

displaying a list of said data entries on the display device;

receiving at said auxiliary input device an indication of one of the data entries of said list;

highlighting the data entry in response to said indication;

after said highlighting, receiving at said auxiliary input device a pause of said indication;

in response to said pause of said indication and without further user interaction when said pause of said indication is unambiguous, executing a filter for data entries that match the value of a field of the highlighted data entry;

displaying a menu on the display device in response to said pause of said indication when said pause of said indication is ambiguous, wherein said menu comprises a menu item, wherein the menu item comprises a command to filter said list based upon a value of a field of the highlighted data entry, and receiving an indication to activate the menu item, wherein for said executing of said filter for data entries that match the value of a field of the highlighted data entry, said field is determined by the menu item that is activated; and displaying results of the filter on the display device.

10. A mobile device of claim 9, wherein said data entries represent electronic messages.

11. A mobile device of claim 10, wherein said highlighted data entry represents an electronic message and said executed filter is a filter for data entries that match the value of a sender field of said highlighted electronic message.

12. A mobile device of claim 10, wherein said highlighted data entry represents an electronic message and said executed filter is a filter for data entries that match the value of a subject field of said highlighted electronic message.

13. A mobile device of claim 9, wherein the data entries represent media files.

14. A mobile device of claim 13, wherein said highlighted data entry represents a media file and said executed filter is a filter for data entries that match the value of an artist field of said highlighted data entry representing a media file.

15. A mobile device of claim 9, wherein the data entries represent contacts.

16. A mobile device of claim 15, wherein said highlighted data entry represents a contact and said executed filter is a filter for data entries that match the value of a company name filed of said highlighted data entry that represents a contact.

17. A physical computer-readable storage medium on which a plurality of executable instructions is stored for execution by a processor of a mobile device to cause the mobile device to perform a method of filtering data entries on the mobile device, wherein each of said data entries contains fields and said fields contain values, and wherein said mobile device accepts input from an auxiliary input device, the method comprising:

displaying a list of said data entries on a display device of the mobile device;

receiving at said auxiliary input device an indication of one of the data entries of said list;

highlighting the data entry in response to said indication;

after said highlighting, receiving at said auxiliary input device a pause of said indication;

in response to said pause of said indication and without further user interaction when said pause of said indication is unambiguous, executing a filter for data entries that match the value of a field of the highlighted data entry;

displaying a menu on the display device in response to said pause of said indication when said pause of said indication is ambiguous, wherein said menu comprises a menu item, wherein the menu item comprises a command to filter said list based upon a value of a field of the highlighted data entry, and receiving an indication to activate the menu item, wherein for said executing of said filter for data entries that match the value of a field of the highlighted data entry, said field is determined by the menu item that is activated; and displaying results of the filter on the display device.

* * * * *